Nov. 7, 1961 A. J. DEVAUD ET AL 3,008,130

MEMORY CONSTRUCTION

Filed Aug. 19, 1957 4 Sheets-Sheet 1

INVENTORS
ALBERT J. DEVAUD
DOMENIC J. TURCHI

BY William R. Nolte

AGENT

INVENTORS
ALBERT J. DEVAUD
DOMENIC J. TURCHI
BY William R. Nolte
AGENT

INVENTORS
ALBERT J. DEVAUD
DOMENIC J. TURCHI
BY William R. Nolte
AGENT

ROW

SENSE

COLUMN

INVENTORS
ALBERT J. DEVAUD
DOMENIC J. TURCHI
BY *William R. Nolte*
AGENT

United States Patent Office 3,008,130

Patented Nov. 7, 1961

3,008,130

MEMORY CONSTRUCTION

Albert J. Devaud, Wayne, and Domenic J. Turchi, Philadelphia, Pa., assignors to Burroughs Corporation, Detroit, Mich., a corporation of Michigan Filed Aug. 19, 1957, Ser. No. 678,773
6 Claims. (Cl. 340—174)

This invention relates to memory devices and, in particular, to a folded plane magnetic memory matrix system.

In the construction of a matrix memory plane, it has been the practice in the past to provide a support consisting essentially of an open rectangular frame of some non-magnetic and non-conducting material such as Bakelite or mica mold having terminals attached thereto on the frame. Wires which are used as conductors for selecting columns and rows of cores are stretched and connected between the frame margins, and the cores are wholly supported by these wires. In such a construction, each memory core is traversed by its wires at an angle to its core axis and is held in place by the wires alone. The sense winding wires are thereafter passed through the angularly disposed cores and it is apparent that the available hole area of the cores, when in the latter position, is materially reduced and, further, a strain is imposed upon the cores by virtue of such suspension. The reduced hole area increases the likelihood of damage to the cores during the threading operation, particularly because of the sharp inner edge of the core which may easily scrape the wire. Furthermore, and because of the fact that the magnetic cores have been supported in closely spaced rows and columns in a single plane, it has been difficult to thread the cores with a sense conductor so as to obtain a noise cancelling effect.

An important object of the invention is to provide an improved memory matrix system.

Another important object of the present invention is to provide improved mechanical means, other than the wires, for supporting magnetic cores in a matrix memory.

Another object of the present invention is to provide a novel apparatus for reducing the unwanted signal which is sensed in the output when reading a column of cores.

A further important object of the present invention is to have wires of the memory matrix traverse each magnetic core substantially parallel to its axis, to thereby take full advantage of the available hole area of each core.

A further object of the present invention is to reduce vibration of the magnetic cores by mounting the same in a rigid support thereby preventing the coils from abrading the enamel from the wires at wire intersections and consequently to eliminate short circuits.

A still further object of the invention is to provide a sub-component of a magnetic memory matrix which consists of a plurality of magnetic cores secured in a strip of non-magnetic and non-conducting material and having wire windings threaded therethrough and secured to terminals at the end of said strip.

Still another object of the present invention is the provision of a magnetic memory core plane structure which enables simple and rapid assembly of a folded column memory plane.

With these objects in view, the principle of the invention may be briefly expressed as comprising a memory matrix array of bistable entities, an example of the latter being magnetic cores, arranged in a non-planar or three-dimensional relationship by means of substantially rigid structure, with suitable current conductor means for causing said entities to be switched from one stable state to the other. A preferred embodiment of the present invention contemplates the provision of a folded memory plane which includes a base comprising a pair of non-magnetic non-conducting plates, affixed in back-to-back relation and having terminals secured along margins of the plates. A plurality of strips each supporting magnetic cores in spaced relation are secured to the outer faces of said base plates so that the axes of like spaced cores of the separate strips are coaxial. Like spaced cores lying adjacent opposite faces of the base constitute folded columns of cores. Windings are passed through the cores parallel to the axes of the cores thus taking full advantage of the core apertures. One of said windings is an output, or sense winding. It threads each individual folded column of cores. The cores forming part of an individual column, and which lie adjacent one face of the base, are threaded by the sense winding in a direction opposite to the remaining cores of the same column which lie adjacent the other face of said base. In this manner the unwanted noise picked up in a given column is cancelled.

Other objects of the invention will be pointed out in the following description and claims, and illustrated in the accompanying drawings, which disclose by way of example, the principle of the invention and the manner of applying that principle.

Figure 2:
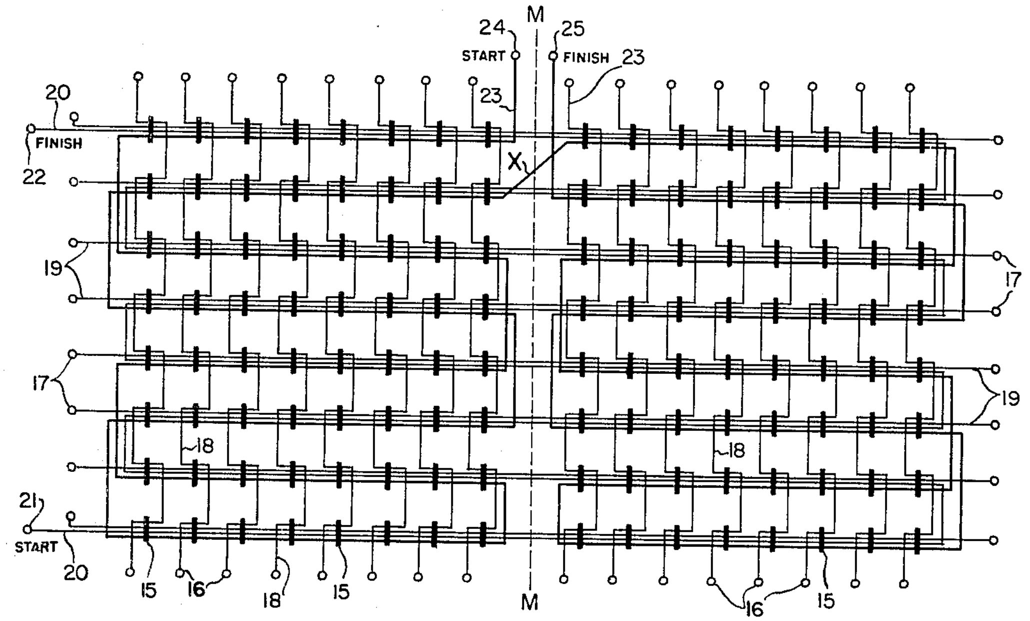
FIG. 2 is a schematic view of the cores adjacent the top and bottom faces of the base shown in FIG. 1 unfolded outwardly along a common margin into a single plane to illustrate the paths of various conductors through said cores.
Figure 1:
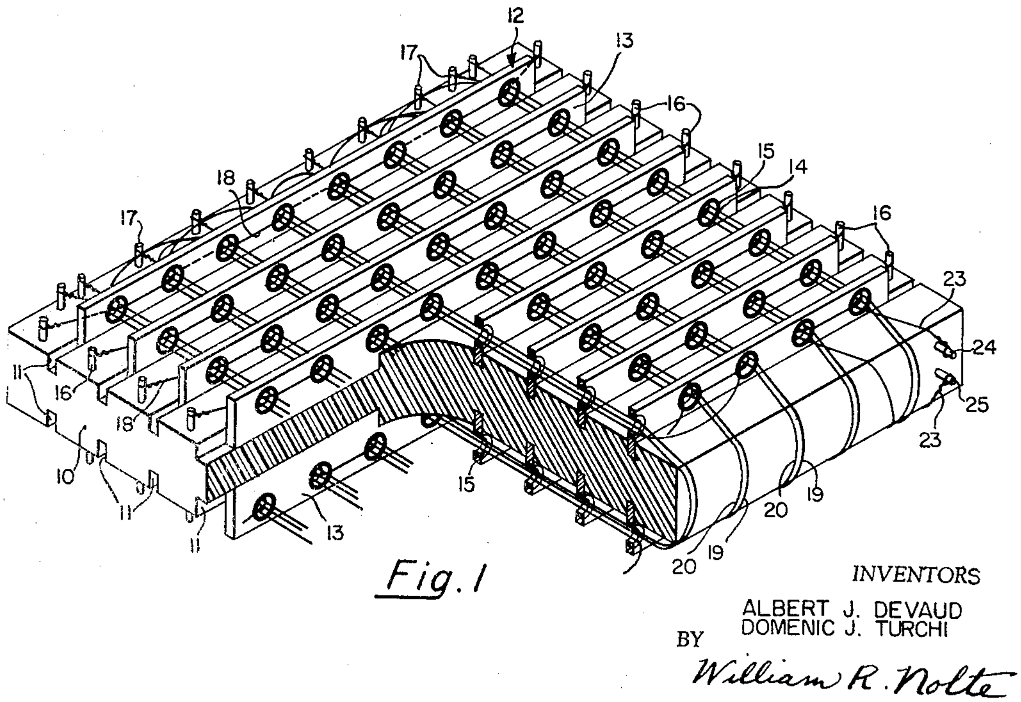
FIG. 1 is a perspective view of one form of structure for a folded plane magnetic memory array.

Referring now to FIGS. 1 and 2, one structure for a folded plane memory core array is shown. To define the expression "folded plane" reference is made in particular to FIG. 2 which shows, schematically, a plane of cores 15. By dividing that plane in two halves along the line M—M, and folding the right hand side under the left hand side by a rotation of 180° about line M—M, the structure of FIG. 1 may be obtained which is herein called a folded plane. In order to support the plane of cores so folded, a base or block 10 of non-conducting, non-magnetic material, rectangular in outline and illustrated with a corner thereof cut away may be used. A plurality of elongated grooves 11 generally parallel and extending the full width of the base are disposed along both top and bottom faces of the block. Suitably secured in each of the grooves is a strip assembly 12. The strip assembly may include a strip 13 having a plurality of apertures 14 spaced along its length. The material defining the margins of said apertures have the property of being responsive to magnetomotive forces and capable of being driven between at least two stable states. In this illustrated embodiment of the invention magnetic cores 15 are inserted within said apertures and suitably cemented or otherwise secured therein. While the cores 15 of this and those of the following illustrated embodiment of the invention are shown as lying within the plane of the strip it should be understood that for the purpose of this invention the cores may be affixed to an external surface of the strip, an important consideration being that the cores be affixed to the strip relative to the margins of the holes in the strip so as to permit a plurality of conductors to be passed through each core.

It is observed further that successive core supporting strip assemblies 12 are so mounted in the grooves 11 of the base that the cores which are like spaced along the length of the strips form columns of cores. Inasmuch as the strips are mounted on opposite faces of the base each column of cores may thus be considered to be folded so that half of the cores of a given column lie adjacent one face of the base and the remaining half of the cores of the same column lie adjacent the other face of the base. The strips are further positioned upon the faces of the base so that the cores constituting each half column of cores are co-axial and the axes of a complete folded column of cores lie in the same plane. A plurality of terminals in the form of tubular pin sockets 16 are suitably secured to the base 10 so that each core supporting strip assembly which constitutes a row of cores is provided with a socket at each of its ends. Additionally a plurality of tubular pin sockets 17 are provided at the terminal ends of each column of cores. With respect to each row of cores, see also FIG. 2, it is seen that a row conductor 18 is threaded in zig-zag manner through the magnetic cores 15 supported along the length of the strip 13 and each wire is secured at its ends to the pin sockets 16. A column conductor 19 is threaded through each column of cores and likewise affixed at each of its ends to a socket 17. A third, or inhibit winding 20, as best seen in FIG. 2, starts with one end connected to socket 21 and zig-zags through the adjacent columns of cores and is tied at its opposite end to terminal 22. A fourth conductor which functions as a sense winding 23 starts with one of its ends wrapped to terminal 24. As in the case of the preferred embodiment, the description of which follows hereinafter, the sense conductor is threaded through all of the cores adjacent one face of the base and is passed over and threaded through the cores adjacent the other face of the base. As shown in FIG. 2 the conductor proceeds from terminal 24 and passes leftward through the top half column of cores. The winding traverses alternate half columns of cores until the bottom half column has been threaded. The winding then proceeds upwardly in zig-zag fashion through those alternate half columns which were skipped until the next to the top column has been threaded. At point X the winding is crossed over to the other half of the core plane and traverses the latter mentioned half of the core plane down and up alternate half columns in a similar manner and is finally fastened to terminal 25.

Figures 3, 4, 5:
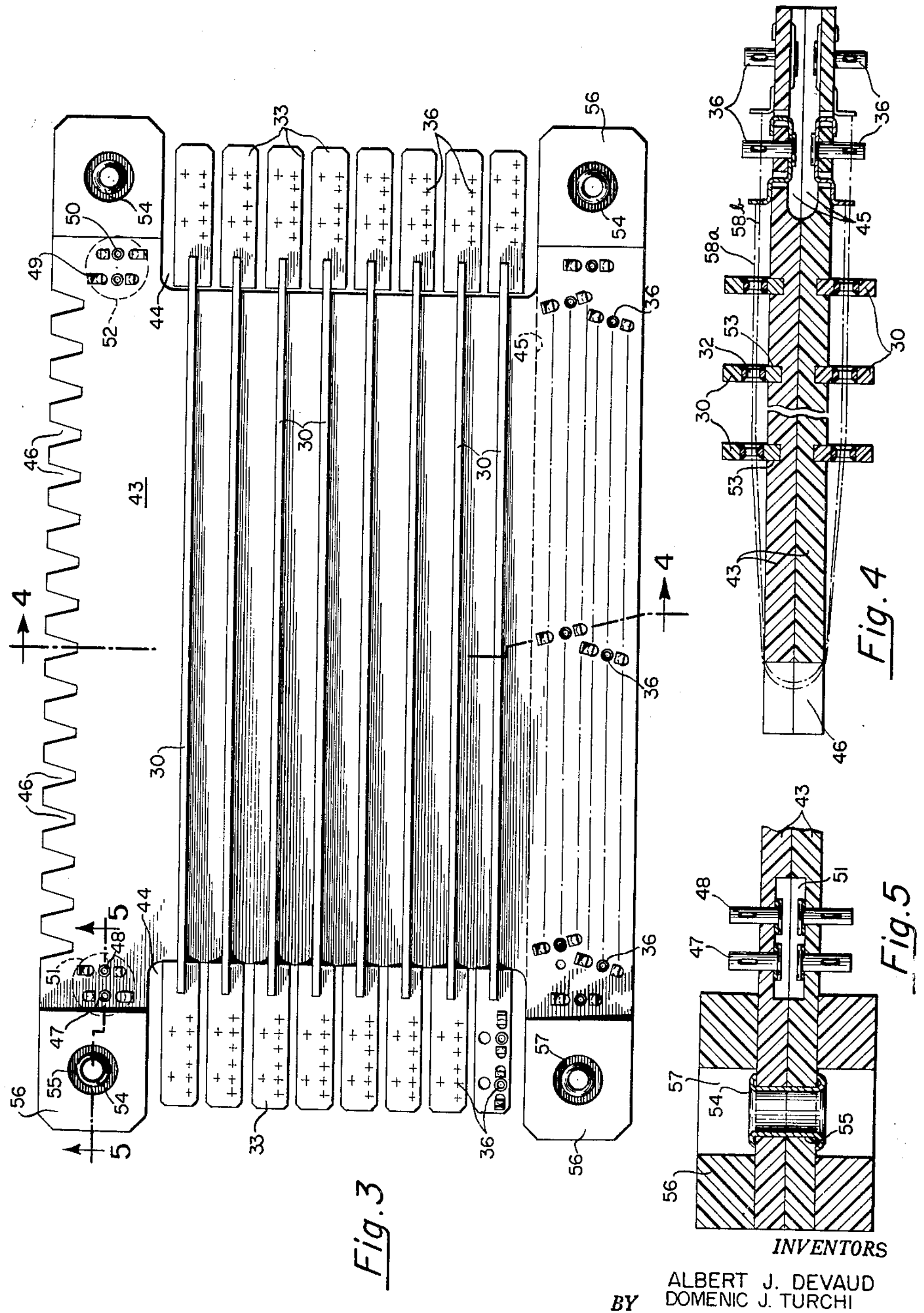
FIG. 3 is a plan view of a preferred structure for a folded plane magnetic memory core array.
FIG. 4 is a view in section along the line 4—4 in FIG. 3.
FIG. 5 is a view in section along the line 5—5 in FIG. 3.
Figure 6:
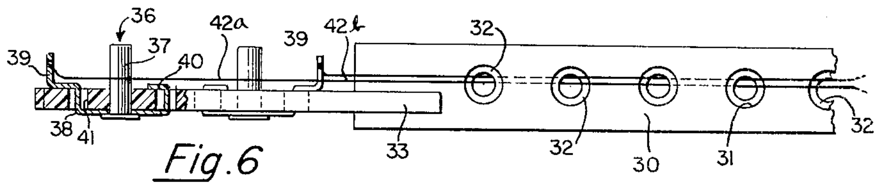
FIG. 6 is a partial view in elevation of a portion of a core supporting strip assembly including a tab secured at one end thereof.
Figure 7:
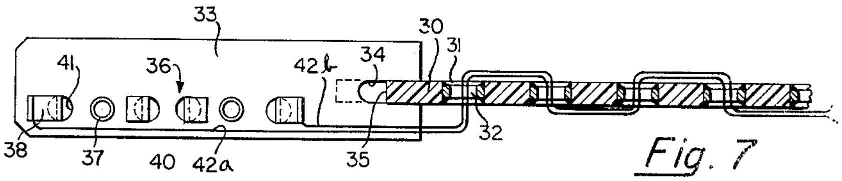
FIG. 7 is a plan view in partial section of the strip portion and tab shown in FIG. 6.

Referring now to FIGS. 3, 6 and 7, a preferred form of the invention is illustrated, and in which core supporting strips 30, made of non-magnetic, non-conducting material, is shown having a plurality of spaced holes 31, punched, drilled or otherwise formed therein. A magnetic core 32 is inserted and nested in each hole, and is secured to said strip in a single plane by means of lacquer or some equivalent cementing agent. Tabs 33, having notches 34 at one end thereof, are received in like complementary notches 35 at either end of strip 30, and suitably cemented in place crosswise the plane of the strip so that cores are substantially at right angles to the plane of the tabs. Obviously a similar geometry could be obtained by molding the whole strip and tabs in one piece. Prior to assembling the tabs to the strips, however, a pair of terminals 36 are secured in tabs 33. Each terminal includes a tubular eyelet 37 and a generally U-shaped staple 38, the eyelet 37 being suitably joined to staple 38 to make good electrical connection therewith. The arms 39, 40 of the staple and the eyelet 37, are passed through three aligned holes 41 in the tab. The arm 40 is then bent at right angles to itself toward the eyelet to grasp the top surface of the tab at the margin of the hole through which it was inserted. The longer other arm 39 is suitably jogged to grasp the tab in a similar fashion while a portion of its length projects upwardly from the top surface of the tab in parallel relation to tubular eyelet 37 and permits the end of the wire to be wrapped around it for electrical connection.

After the tabs with the terminals so mounted therein have been cemented to the strips 30, as described above, a pair of row conductors *42a*, *42b*, are threaded in zig-zag fashion through the magnetic cores 32 supported along the length of the strip and each wire is secured at its ends to arm 39 of an individual one of the terminals 36. Row conductors *42a*, *42b*, have the same function in that one simply complements the other when used in a transistor circuit as compared to a tube circuit. It is apparent that a plurality of strip units so assembled, provided with magnetic cores and including the row wires *42a*, *42b*, may be tested prior to being assembled upon base plates 43.

Referring now to FIGS. 3, 4, and 5, a pair of identical base plates 43 in back to back relation are shown as constituting the supporting structure for the above described strip units of the memory matrix. In order to facilitate the description, since the base plates are identical, only the top plate will be described in detail. Each base plate 43 is generally rectangular in shape and includes an elongated cutout on either side as at 44. A plurality of terminals 36 are affixed to said plate along its lower margin as seen in FIG. 3 and the terminals are mounted in the identical manner as described with respect to the tabs 33. As seen in FIG. 4 the inner surface of each plate has been undercut as at 45 so that when said plates are assembled in back relation, the terminals of the top member will not contact those of the lower member.

The upper margin of each board opposite the margin containing the terminals has a plurality of notches as at 46. These notches are provided to keep the column conductors in position as the conductors are threaded through the cores of one base plate to like spaced cores adjacent the other plate. Additional terminals 47, 48, and 49, 50, are secured likewise adjacent the first and last notches along the top margin, as viewed in FIG. 3. These likewise are identical with the terminals 36 affixed in tabs 33. Each plate 43 is further recessed adjacent terminals 47, 48, as at 51, see FIG. 5, and as at 52 for terminals 49 and 50. Thus oppositely disposed terminals do not make contact when the base plates are placed in back to back contact. Each base plate further includes a plurality of grooves 53, see FIG. 4, which extend the full width of the board between cutouts 44. The aforementioned strip units provided with the magnetic cores nested therein, and windings threaded therebetween, are suitably cemented in said grooves. It will be noted that the tabs 33 at opposite ends of the strips 30 are received in the elongated cutouts 44. Further, the tabs are so disposed upon the strips 38 relative to the spacing of the cores such that correct alignment of like spaced cores in adjacent strips is assured when the tab edges abut the margins of notches 44. Thus all of the cores in a given column are in registration and the axes of said cores are substantially coaxial. With the wired core strip assemblies so mounted upon a pair of base plates, the plates may be placed in back-to-back relation and fastened together by means of rivets or eyelets 54, passed through holes 55, located in the four corner portions of each of the base plates. Spacer blocks 56, having enlarged apertures 57, may likewise be fastened adjacent the headed ends of the rivets 54, see FIG. 5, in any desired manner. Obviously the whole plate with spacing projections, in lieu of the spacer blocks, could be obtained with a single molding. The spacer blocks plus the tubular eyelets 37 of terminals 36 permit stacking of like assembled folded plane memories.

Figure 10:
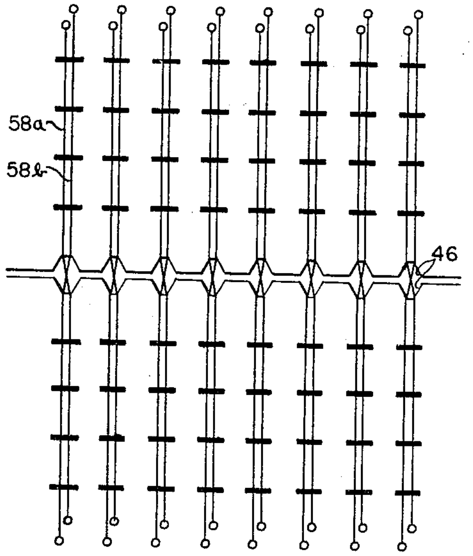
FIG. 10 is a view similar to FIG. 9 showing the way in which the column conductors are threaded through the unfolded columns of cores.

With the base plates 43 assembled in back-to-back relation, columns of nested cores may now be wired. Referring to FIG. 4, also FIGS. 8 and 10, each column of cores has a pair of conductors 58*a*, 58*b*, passed therethrough. These wires are fastened at one end to the top terminals 36 and are passed through a half column of cores adjacent the top base plate, and are bent in the notches 46 aligned with the column and are further passed through the bottom aligned half column of cores and secured at their opposite ends to the bottom terminals. It can be clearly seen in FIG. 10 that the wires so threaded through the cores are substantially parallel to the axes of said cores.

Figure 8:
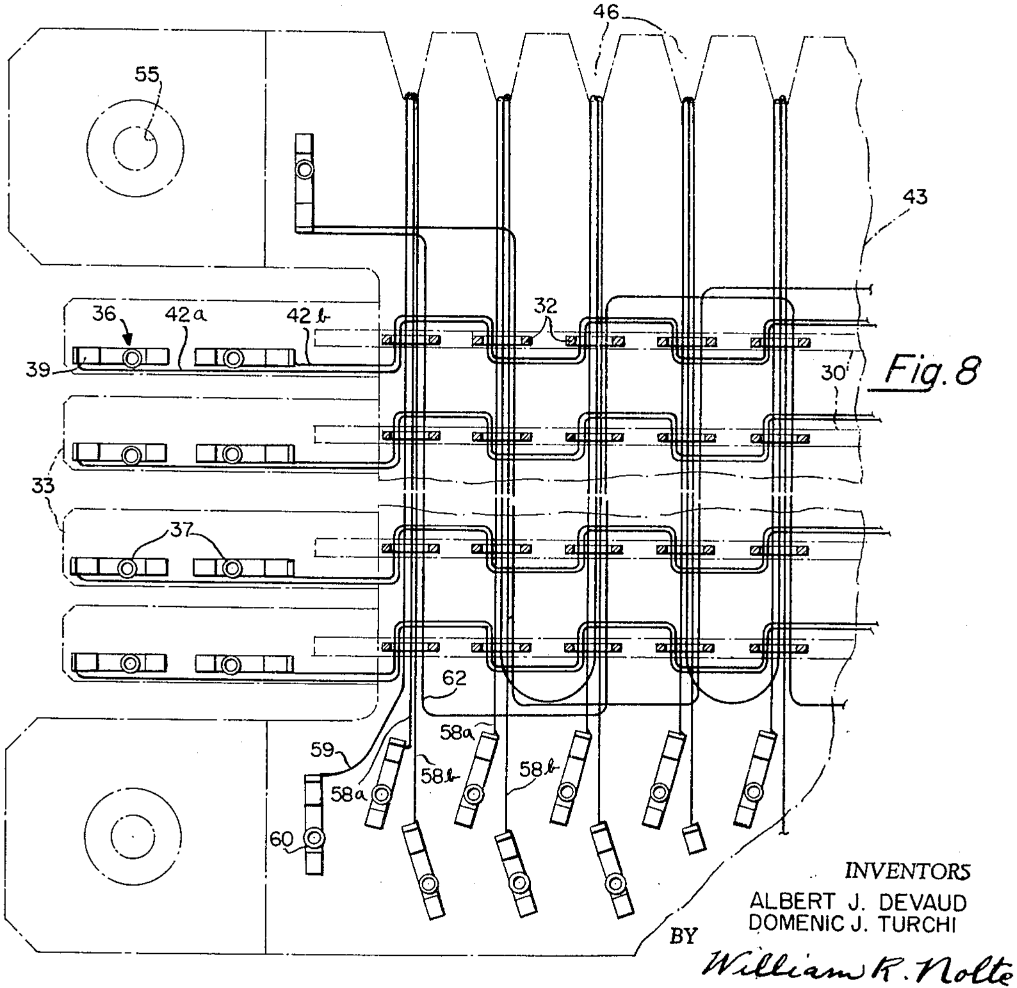
FIG. 8 is an enlarged partial plan view of the magnetic memory plane showing a plurality of core supporting strips in assembled relation on a base plate.
Figure 11:
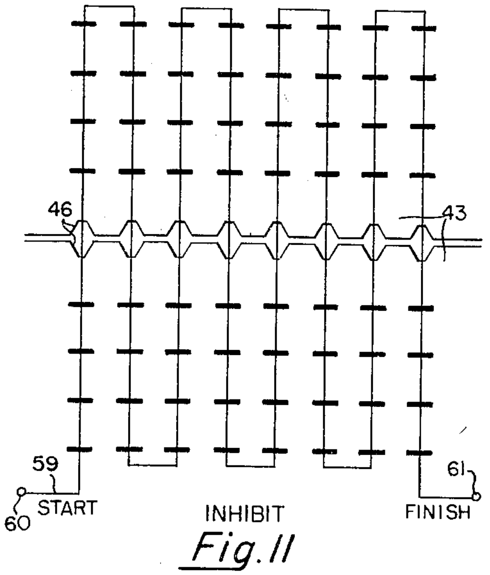
FIG. 11 is a view similar to FIG. 9 showing the way in which the inhibit conductor is threaded through the adjacent unfolded columns of cores.

Referring now to FIG. 8 and schematic FIG. 11, it is seen that each of the cores of the entire matrix is threaded by a fifth conductor 59. This fifth conductor 59 serves in an inhibit function. The inhibit conductor threads each core in such a direction that the inhibit current driven through each core, which is also half-selecting value, opposes one of the half-selecting currents which flow through the selected row or column conductors 42*a*, 42*b*, 58*a*, 58*b*. As seen in FIG. 11 the inhibit winding starts at terminal 60, proceeds up the first column, turns down into the second column, up into the third, and so forth, terminating at terminal 61. As will be explained later, the function of the inhibit conductor is to permit the writing of a "0" at the selected core.

Figure 9:
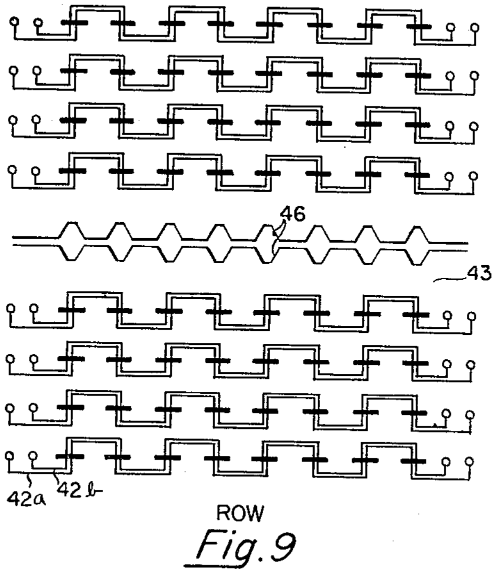
FIG. 9 is a schematic view of the cores adjacent both base plates in their unfolded condition and showing in particular the manner by which the row conductors are threaded through the rows of cores, and further with the actual number of rows and columns cores reduced to aid the illustration thereof.
Figure 12:
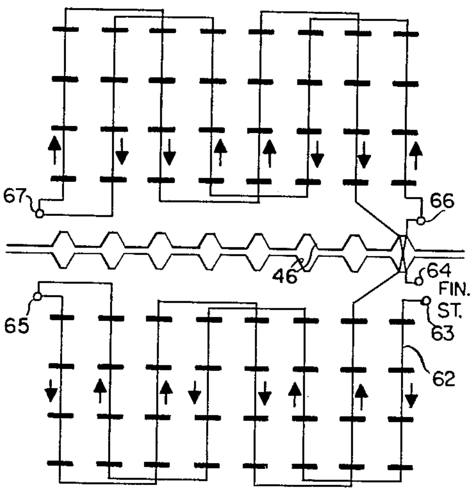
FIG. 12 is a view similar to FIG. 9 showing how the sense conductor is threaded through the half columns of cores adjacent each base plate.

Each of the cores in the matrix is also threaded with a sixth conductor 62 which functions as a sensing or output winding. It should be noted that FIG. 12, shown along with FIGS. 9, 10 and 11 in schematic form, that the top and bottom base plates have been unfolded outwardly so that they lie in a single plane and further that the top half of the figure represents the array of cores which are adjacent the lower base plate. Of each column of cores further, half of each column is supported adjacent one base plate and the other half adjacent the other base plate. In response to the switching of a core, a voltage is induced in this sensing conductor 62 which is delivered at output terminals 63, 64. The sense conductor is threaded through all of the cores on one side of the base and is then passed over to cores adjacent the bottom face of the base. More particularly the sense winding shown in FIG. 12 is shown as starting at terminal 63 at the right hand side of the figure and is then passed down the bottom half of the most rightward column of cores. The winding traverses the core plane to the left by being then threaded up and down through alternate half-columns of cores until the second column to the left has been threaded. The winding may then be tied as at 65. The winding is then passed down the most leftward half-column of cores adjacent the same base plate and traverses alternate half-columns of cores, up and down, until the second column from the right has been threaded. This then completes the threading of the cores adjacent the top base plate. The sense winding is then passed over to the terminal 66 and then up through the most rightward half-column of cores. The sense winding is then threaded alternately down and up across the bottom base plate to the left to wrap around terminal 67. The winding is then passed up through the most leftward half-column and then down and up through the remaining alternate columns to finally cross over and tie to terminal 64. It can be observed that each half-column of cores is thus threaded in a different direction by the sense winding.

Summarizing, it is observed that each row of the matrix is threaded by two conductors 42*a*, 42*b*, which are used to extract or "read" information and to insert or "write" information. More specifically to "read," half-selecting current is passed through the conductor 42*a* of the selected row in a direction tending to drive the cores of that row to the "0" state. To "write," half-selecting current is passed through the conductor 42*b* in the opposite direction to drive the cores of that row halfway to the "1" state. Each column of cores is threaded by two conductors 58*a*, 58*b*, to read and write respectively in the same manner. As in the case of the row conductors the current driven through the column conductors are of half-selecting value.

The direction of the half-selecting currents through the row and column conductors is additive in the core which is common to both the row and the column, so that upon the simultaneous application of half-selecting driving currents through a selected row conductor and through a selected column conductor, the single core which is common to both the row and column receives full-selecting value of flux and, assuming the remanent state of the core to be opposite that in which the full-selecting current tends to drive it, the core will flip.

In response to the switching of a core, a voltage is induced in the aforementioned sense conductor 62 which is delivered to an output circuit not shown. In this connection when a core is selected for switching, a half-selecting value of current flows through all the cores mounted in the strip 30 constituting a row through all of the cores of the folded column, coaxially aligned along both faces of the base. Unless cancellation is effected it can be seen that the combined noise developed in the cores in the selected row and column would produce an objectionably large noise pulse on the sense winding. The above described structure overcomes this shortcoming by threading the sense conductor through the cores so that the voltage induced in half of the cores in any given row is opposite in polarity to that induced in the other half of the cores of that row. Similarly, the sense winding threads half the cores in any given column in such direction the sum voltage induced therein is opposite to that induced in the other half of the cores of the column.

*Operation*

The "write" operation consists of first applying half-selecting voltage to the row and column conductors 42*a*, 58*a*, of the selected row and column to first "clear" the core, i.e., to return the core to "0" state. If during the clear operation, the selected core switches, a voltage is induced in the sense winding but this output is not gated. If it is desired to write a "1" into the selected core, half-selecting pulses are applied to conductors 42*b*, 58*b*, of the selected row and the selected column. This switches the selected core to the "1" state. If a "0" instead of a "1" is to be written into the core, a half-selecting inhibit pulse is driven through the inhibit winding 59 simultaneously with the application of half-selecting "write" pulse to the selected row and column windings 42*b*, 58*b*, respectively. The inhibit current prevents the selected core in question from switching. The half-selecting inhibit pulses pass through all of the other cores of the matrix, but since no output is taken from the inhibit winding, the noise voltages generated on this winding are ignored.

The "read" operation will now be described, the steps of this operation are similar to that of the "write" operation in that half-selecting pulses are first applied to the conductors 42*a*, 58*a*, of the selected row and column respectively. The pulses being additive combine to switch the core to the "0" state. If the selected core is already in the "0" state, it does not switch and no output pulse is produced in the sensing conductor 62. The absence of an output pulse signifies that a "0" has been read. Following the reading out of the "0," the core is returned to the state it had prior to reading. This is done in the case where a "0" has been sensed by applying half-selecting pulses to the conductors *42b*, *58b* of the selected row and column and also to the inhibit winding 59, the half-selecting inhibit pulse thereby preventing the selected core from switching. If the core being read is in the "1" state at the time of reading, then the core switches and an output pulse is sensed on the sense conductor 62. The output pulse is applied to the utilization circuit to signify that a "1" has been read. The output pulse is also utilized to inhibit the application of an inhibit pulse to the inhibit winding. Thus the "1" is written back into the selected core by the application of half-selecting pulses on each of the conductors *42b* and *58b*.

What is claimed is:

1. A coincident current magnetic memory matrix comprising, in combination, a base member made of non-magnetic and electrically non-conductive material, a plurality of strips of non-magnetic and electrically non-conductive material affixed to and projecting perpendicularly away from each side of the base member in parallel relation to one another, a plurality of magnetic cores secured in like spaced apart apertures along the length of each strip, each core being adapted to assume one or the other of two stable states of magnetization and to be switched from either state to the other state, the cores in each strip constituting a row of the matrix, a row conductor individual to each of said rows of cores and threaded therethrough, homologously positioned cores in said affixed strips each constituting a column of cores of the matrix folded about the base member with substantially half the cores of the column being disposed on one side of the member and the remaining half of the cores of the column being disposed on the opposite side of the member, a column conductor individual to each of said folded columns of cores and threaded therethrough, and a single sense conductor for all of the cores of the matrix and threaded through the half columns of cores on one side of the matrix in a first sense with respect to the column conductors and thereafter threaded through the corresponding half columns of cores on the opposite side of the matrix in a second sense with respect to the column conductors which is opposed to the first said sense whereby upon the switching of a selected core in the matrix by coincident energization of the row and column conductors intersecting the same the induced voltages produced in the sense conductor by partial switching of the non-selected cores threaded by the energized column conductor tend to mutually cancel one another.

2. In a coincident magnetic memory matrix array comprising, in combination, a supporting member, a first plurality of strips made of non-magnetic and electrically non-conductive material having like spaced apertures therein and supported by the member in spaced apart parallel relation to one another along one side of the member, a second plurality of strips of non-magnetic and electrically non-conductive material having like spaced apertures therein and supported by the member in spaced parallel relation to one another and to said first plurality of strips along the opposite side of the member, a row of toroidally shaped bistable magnetic cores nested in the apertures along the length of each strip, the mounted relation of the strips and the spatial relation of the cores being such that the homologously positioned cores of the strips on each side of the base member are in substantial coaxial alignment with one another and such that the homologously positioned cores of the strips on both sides of the supporting member together constituting columns of the matrix array which are folded about the supporting member and exhibiting a U-shaped configuration, a row conductor individual to each of said strips and threading the cores thereof, a column conductor individual to each of said folded columns of cores and threaded therethrough, and a single sense conductor for all of the cores of the matrix and threaded through the cores on one side of the matrix in a first sense with respect to the column conductors and thereafter threaded through the corresponding cores on the opposite side of the matrix in a second sense with respect to the column conductors which is opposed to the first said sense whereby upon the switching of a selected core in the matrix by coincident energization of the row and column conductors intersecting the same the induced voltages produced in the sense conductor by partial switching of the non-selected cores threaded by the energized column conductor tend to mutually cancel one another.

3. A coincident current magnetic memory matrix comprising, in combination, supporting means providing a base reference plane, a plurality of similarly shaped strips of non-magnetic and electrically non-conductive material affixed to the supporting means in parallel relation to one another, a plurality of toroidally shaped magnetic cores each adapted to assume one or the other of two stable states of magnetization and to be switched from either state to the other state, said plurality of cores being carried by the strips in like spaced apart apertures therein and disposing the cores at the intersection of columns and rows of a matrix, substantially half of the cores in each column being located on one side of said reference plane and the remaining half of the cores in each column being located on the opposite side of said reference plane thus providing a folded-column arrangement of the matrix about the reference plane, a row conductor individual to each of said rows of cores and threaded therethrough, a column conductor individual to each of said folded columns of cores and threaded therethrough, and a single sense conductor for all of the cores of the matrix and threaded through the half columns of cores on one side of the matrix in a first sense with respect to the column conductors and thereafter threaded through the corresponding half columns of cores on the opposite side of the matrix in a second sense with respect to the column conductors which is opposed to the first said sense whereby upon the switching of a selected core in the matrix by coincident energization of the row and column conductors intersecting the same the induced voltages produced in the sense conductor by partial switching of the non-selected cores threaded by the energized column conductor tend to mutually cancel one another.

4. A coincident current magnetic memory matrix comprising, in combination, supporting means providing a base reference plane, a plurality of similarly shaped strips of non-magnetic and electrically non-conductive material affixed to the supporting means in parallel relation to one another, a plurality of toroidally shaped magnetic cores each adapted to assume one or the other of two stable states of magnetization and to be switched from either state to the other state, said plurality of cores being carried by the strips with the axes of the cores extending perpendicularly thereto and with the homologously positioned cores being in axial alignment, said plurality of cores forming a matrix of intersecting rows and columns having the columns of the matrix folded around the reference plane so that substantially half the cores are on one side of the plane and the remaining half on the other side, a row conductor individual to each of said rows of cores and threaded therethrough, a column conductor individual to each of said folded columns of cores and threaded therethrough, and a single sense conductor for all of the cores of the matrix and threaded through the half columns of cores on one side of the matrix in a first sense with respect to the column conductors and thereafter threaded through the corresponding half columns of cores on the opposite side of the matrix in a second sense with respect to the column conductors which is opposed to the first said sense whereby upon the switching of a selected core in the matrix by coincident energization of the row and column conductors intersecting the same and induced voltages produced in the sense conductor by partial switching of the non-selected cores threaded by the energized column conductor tend to mutually cancel one another.

5. A folded magnetic memory matrix array including a pair of similar electrically non-conducting base sheets arranged in superimposed contacting back-to-back relationship, each sheet including a plurality of spaced parallel grooves extending across its outer face to opposite marginal edges thereof, a plurality of strips of non-magnetic and electrically non-conducting material having like spaced apertures therein, a plurality of bistable magnetic cores secured to each aperture, the cores in each strip constituting a row, planar tab means mounted on opposite ends of each of said strips with the plane of each tab means disposed perpendicular to the plane of each strip, the distance between oppositely disposed tab means affixed to each strip corresponding to the distance between the opposite marginal edges of said sheets, each of said strips being secured in one of said grooves and in edgewise relation to the plane of the sheet containing the groove with the edge margins of said tab means abutting the marginal edges of said sheet to thereby cause the cores on each side of the base sheets to be arranged coaxially, so that the like spaced cores adjacent one of said outer faces constitute a first half-column of cores and so that corresponding like spaced cores adjacent the opposite outer face constitute the remaining half-column of the same column of cores, electrical terminals affixed to each of said oppositely disposed tab means on each strip, a row conductor individual to each of said rows of cores and threaded therethrough and secured to the terminals on said tab means, electrical terminals affixed to said sheets in line with the coaxially aligned cores of each half column of cores, a column conductor individual to each of said folded columns of cores and threaded therethrough and secured to said terminals on said sheets, and a single sense conductor for all of the cores of the matrix and threaded through the cores on one side of the matrix in a first sense with respect to the column conductors and thereafter threaded through the corresponding cores on the opposite side of the matrix in a second sense with respect to the column conductors which is opposed to the first said sense whereby upon the switching of a selected core in the matrix by coincident energization of the row and column conductors intersecting the same the induced voltages produced in the sense conductor by partial switching of the non-selected cores threaded by the energized column conductor tend to mutually cancel one another.

6. A folded magnetic memory matrix array including a pair of similar electrically non-conducting base sheets arranged in superimposed contacting back-to-back relationship, each sheet including a plurality of electrical terminals secured along one marginal edge thereof and a plurality of notches disposed along the opposite marginal edges thereof, each sheet including a plurality of parallel disposed grooves extending across its outer face parallel to the marginal edge containing said terminal connectors and extending to the opposite remaining marginal edges thereof, a plurality of strips of electrically non-conducting and non-magnetic material having like spaced apertures therein, a plurality of bistable magnetic cores secured in each aperture, the cores in each strip constituting a row in the matrix array, planar tabs mounted on opposite ends of said strips with the plane of each tab being disposed perpendicular to the plane of each strip, the distance between oppositely disposed tabs affixed to each strip corresponding to the distance between the said opposite remaining marginal edges of said sheets, each of said strips being secured in one of said grooves and in edgewise relation to the plane of the sheet containing the groove with the edge margins of said tabs abutting the marginal edges of said sheet to thereby cause the cores on each side of the sheets to be arranged coaxially, so that the like spaced cores adjacent one of said outer faces constitute a first half-column of cores and so that corresponding like spaced cores adjacent the opposite outer face constitute the remaining half-column of the same column of cores, electrical terminals secured to each of said oppositely disposed tabs on each strip, a row conductor individual to each of said rows of cores and threaded therethrough and secured at its opposite ends and secured to the terminals on the tabs, a column conductor individual to each of said folded columns of cores received in said notches and threaded columnwise through the coaxially aligned cores and secured to said terminals on said sheets, and a single sense conductor for all of the cores of the matrix array and threaded through the cores on one side of the matrix in a first sense with respect to the column conductors and thereafter threaded through the corresponding cores on the opposite side of the matrix in a second sense with respect to the column conductors which is opposed to the first said sense whereby upon the switching of a selected core in the matrix by coincident energization of the row and column conductors intersecting the same the induced voltages produced in the sense conductor by partial switching of the non-selected cores threaded by the energized column conductor tend to mutually cancel one another.

References Cited in the file of this patent

UNITED STATES PATENTS

| | | |
|---|---|---|
| 2,724,103 | Ashenhurst | Nov. 15, 1955 |
| 2,784,391 | Rajchman | Mar. 5, 1957 |
| 2,911,627 | Kilburn | Nov. 3, 1959 |